United States Patent
Diacovo (10) Patent No.: US 12,502,400 B2
(45) Date of Patent: *Dec. 23, 2025

(54) METHOD OF PREVENTING OF SYSTEMIC-TO-PULMONARY-ARTERY SHUNT THROMBOSIS

(71) Applicant: Chiesi Farmaceutici S.p.A., Parma (IT)

(72) Inventor: Thomas Diacovo, Larchmont, NY (US)

(73) Assignee: CHIESI FARMACEUTICI S.P.A., Parma (IT)

( * ) Notice: Subject to any disclaimer, the term of this patent is extended or adjusted under 35 U.S.C. 154(b) by 2 days.

This patent is subject to a terminal disclaimer.

(21) Appl. No.: 18/583,315

(22) Filed: Feb. 21, 2024

(65) Prior Publication Data
US 2024/0342205 A1    Oct. 17, 2024

Related U.S. Application Data

(63) Continuation of application No. 17/513,079, filed on Oct. 28, 2021, now abandoned, which is a continuation of application No. 16/609,800, filed as application No. PCT/EP2018/066817 on Jun. 22, 2018, now Pat. No. 11,260,071.

(60) Provisional application No. 62/524,102, filed on Jun. 23, 2017.

(51) Int. Cl.
    *A61K 31/7076*    (2006.01)
    *A61K 9/00*        (2006.01)
    *A61P 7/02*        (2006.01)

(52) U.S. Cl.
    CPC ........ *A61K 31/7076* (2013.01); *A61K 9/0019* (2013.01); *A61K 9/0053* (2013.01); *A61P 7/02* (2018.01)

(58) Field of Classification Search
    None
    See application file for complete search history.

(56) References Cited

U.S. PATENT DOCUMENTS

| 8,680,052 B1 | 3/2014 | Arculus-Meanwell et al. |
| 2012/0141468 A1 | 6/2012 | Chen et al. |
| 2012/0184504 A1 | 7/2012 | Strony et al. |
| 2014/0073590 A1 | 3/2014 | Kylhammar et al. |

FOREIGN PATENT DOCUMENTS

| CA | 2778880 A1 | 5/2011 |
| CN | 106102750 A | 11/2016 |
| WO | 2011060066 A9 | 5/2011 |
| WO | 2012109406 A1 | 8/2012 |
| WO | 2014143107 A1 | 9/2014 |

OTHER PUBLICATIONS

Lv Ying, et al., "Analysis of complications of pulmonary shunt in 54 children with complex congenital heart disease", Chinese Journal of Difficult and Complicated Cases, vol. 15, No. 1, pp. 70-76, Jan. 11, 2016.
Ge Junbo et al., "Progress in Modern Cardiology", Fudan University Press, pp. 85-88, May 31, 2014.
First Office Action translated of corresponding Chinese Application No. 201880037007.7 mailed on Oct. 28, 2022.
Second Office Action translated of corresponding Chinese Application No. 201880037007.7 mailed on Sep. 16, 2023.
Third Office Action translated of corresponding Chinese Application No. 201880037007.7 mailed on Feb. 23, 2024.
A. Siddique et al., "New antiplatelet drugs: beyond aspirin and clopidogrel", International Journal of Clinical Practice, vol. 63, No. 5, pp. 776-789, May 1, 2009.
Monagle et al, "Thrombosis in children with BT shunts, Glenns and Fontans", Progress in Pediatric Cardiology, Elsevier, Amsterdam, NL, vol. 21, No. 1, 2005, pp. 17-21.
Examination report of corresponding Indian Application No. 202017000228 dated Jan. 2020.
Heidari-Bateni Giv et al., "Defining the best practice patterns for the neonatal systemic-to-pulmonary artery shunt procedure", Journal of Thoracic and Cardiovascular Surgery, vol. 147, No. 3, p. 869, 2014.
The International Preliminary Report on Patentability and Written Opinion filed in corresponding PCT Application No. PCT/EP2018/066817, dated Dec. 24, 2019; 7 Pages.
Requisition of corresponding Canadian Application No. 3,060,345 dated Dec. 7, 2023.

*Primary Examiner* — Patrick T Lewis
(74) *Attorney, Agent, or Firm* — Vorys, Sater, Seymour and Pease, LLP; Maryellen Feehery Hank (57) ABSTRACT

The present invention is directed to the use of cangrelor for the treatment and/or prevention of shunt thrombosis in patients suffering congenital heart diseases undergoing shunt surgery. The invention is also directed to the use of cangrelor for the treatment and/or prevention of stent thrombosis in pediatric patients undergoing stent implantation.

15 Claims, 7 Drawing Sheets

| | FI₃₀₀ₛ (mean ± SD) | % inhibition |
|---|---|---|
| Before | 112.80 ± 14.04 | 0 |
| During | 36.69 ± 3.38 | 67 |
| After | 113.26 ± 12.53 | 0 |

METHOD OF PREVENTING OF SYSTEMIC-TO-PULMONARY-ARTERY SHUNT THROMBOSIS

CROSS REFERENCE TO RELATED APPLICATIONS

This application claims priority to U.S. Ser. No. 62/524,102, filed on Jun. 23, 2017, the entire contents of which are hereby incorporated by reference in their entirety.

FIELD OF THE INVENTION

The invention pertains to the field of thromboprophylaxis and particularly to preventing stent thrombosis in pediatric patients, including neonates, and preventing shunt thrombosis in high risk patients undergoing systemic-to-pulmonary artery shunt surgery. Neonates with cyanotic congenital heart disease palliated with a systemic-to-pulmonary artery shunt are at high risk of thrombosis.

BACKGROUND OF THE INVENTION

Congenital heart defects (CHD) are the most common type of birth defect. It affects 8 out of every 1,000 newborns and has a wide range of disease severity. However, the majority of those born with structural heart anomalies are otherwise healthy, and corrective procedures may result in a normal lifespan (Monagle, 2005). While great technical advances have been achieved in palliative and corrective measures and in the care of critically ill neonates, these procedures are associated with an increased risk of acute thrombotic events (ATE) in this patient population (Monagle, 2004; Tormene et al., 2006; Monagle et al., 2008; Manlhiot et al., 2011).

Palliation with a modified BT shunt is indispensable for the management of a select group of neonates with cyanotic congenital heart disease. However, such patients are at high risk for thrombotic complications such as acute shunt occlusion, which remains a major source of morbidity and mortality. Although aspirin therapy, in general, is thought to reduce the risk of shunt occlusion and improve survival, it is typically not administered until 12 to 24 hours after surgery. A limited retrospective review of pediatric cardiac patients with evidence of shunt occlusion at Columbia University Medical Center revealed that the majority of cases occurred prior to the administration of an antiplatelet agent, establishing an unmet need for thromboprophylaxis during this vulnerable period.

Acute thromboembolic events (ATE) are rapidly becoming the new epidemic in centers that care for critically ill neonates due to an increase in invasive monitoring, lifesaving technologies such as extracorporeal membrane oxygenation (ECMO), and new surgical techniques and graft materials used to repair complex congenital heart disease. (Monagle P, Newall F, Barnes C, Savoia H, Campbell J, Wallace T, Crock C. "Arterial thromboembolic disease: a single-centre case series study." J Paediatr Child Health. 2008; 44:2832; Tormene D, Gavasso S, Rossetto V, Simioni P. "Thrombosis and thrombophilia in children: a systematic review." Semin Throm. Hemost. 2006; 32:724-728; Manlhiot C, Menjak I B, Brandso L R, Gruenwald C E, Schwartz S M, Sivarajan V B, Yoon H, Maratta R, Carew C L, McMullen J A, Clarizia N A, Holtby H M, Williams S, Caldarone C A, Van Arsdell G S, Chan A K, McCrindle B W. "Risk, clinical features, and outcomes of thrombosis associated with pediatric cardiac surgery." Circulation. 2011; 124:1511-1519; Chalmers E A. "Pediatric thrombosis." J Clin Pathol. 2000; 53:419-423.) In the latter case, infants (<6 months) constitute the major proportion (~70%) of patients seen in tertiary care centers with ATEs. (Monagle P. "Anticoagulation in the young." Heart. 2004; 90:808-812.) In particular, those with single ventricle physiology who require a systemic-to-pulmonary artery shunt placement (e.g. modified Blalock-Taussing or central shunts) are at greatest risk, especially in the early postoperative period. (Manlhiot C, Menjak I B, Brandão L R, Gruenwald C E, Schwartz S M, Sivarajan V B, Yoon H, Maratta R, Carew C L, McMullen J A, Clarizia N A, Holtby H M, Williams S, Caldarone C A, Van Arsdell G S, Chan A K, McCrindle B W. "Risk, clinical features, and outcomes of thrombosis associated with pediatric cardiac surgery." Circulation. 2011; 124:1511-1519; Fenton K N, Siewers R D, Rebovich B, Pigula F A. "Interim mortality in infants with systemic-to pulmonary artery shunts." Ann Thorac Surg. 2003; 76:152-156; Monagle Paul. "Thrombosis in children with BT shunts," Glenns and Fontans. Prog Pediatr Cardiol. 2005; 21:17-21; Al Jubair K A, Al Fagih M R, Al Jarallah A S, Al Yousef S, Ali Khan M A, Ashmeg A, Al Faraidi Y, Sawyer W. "Results of 546 Blalock-Taussig shunts performed in 478 patients." Cardiol Young. 1998; 8:486-490.) Consequently, this has resulted in suboptimal postoperative outcomes as exemplified in a retrospective review of 2,058 neonates who underwent palliation with a systemic-to-pulmonary artery shunt at multiple centers; discharge mortality and complication rates were around an aggregate of 6.7% and 12.3%, respectively. (Heidari-Bateni G, Norouzi S, Hall M, Brar A, Eghtesady P. "Defining the best practice patterns for the pediatric systemic-to-pulmonary artery shunt procedure." J Thorac Cardiovasc Surg. 2014; 147:869-873.) Early institution of aspirin, an irreversible inhibitor of platelet cyclooxygenase, within 12 hours of surgery has reduced the risk of shunt thrombosis and death in this patient population. (Al Jubair K A, Al Fagih M R, Al Jarallah A S, Al Yousef S, Ali Khan M A, Ashmeg A, Al Faraidi Y, Sawyer W. Results of 546 "Blalock-Taussig shunts performed in 478 patients." Cardiol Young. 1998; 8:486-490; Heidari-Bateni G, Norouzi S, Hall M, Brar A, Eghtesady P. "Defining the best practice patterns for the pediatric systemic-to-pulmonary artery shunt procedure." J Thorac Cardiovasc Surg. 2014; 147: 869-873; Li J S, Yow E, Berezny K Y, Rhodes J F, Bokesch P M, Charpie J R, Forbus G A, Mahony L, Boshkov L, Lambert V, Bonnet D, Michel-Behnke I, Graham T P, Takahashi M, Jaggers J, Califf R M, Rakhit A, Fontecave S, Sanders S P. "Clinical outcomes of palliative surgery including a systemic-to-pulmonary artery shunt in infants with cyanotic congenital heart disease: does aspirin make a difference?" Circulation. 2007; 116:293-297; Motz R, Wessel A, Ruschcwski W, Bürsch J. "Reduced frequency of occlusion of aorto-pulmonary shunts in infants receiving aspirin." Cardiol Young. 1999; 9:474-477). However, there remains an urgent need for pharmacologic protection prior to the administration of an oral antiplatelet agent in order to minimize the period during which patients are vulnerable to an ATE.

Thienopyridines (e.g. clopidogrel) are a class of antiplatelet agents that target the ADP receptor P2Y12 and are known to reduce the risk of ischemia and thrombosis in adult patients during and after percutaneous coronary intervention (PCI). They do so by impairing P2Y12 potentiation of platelet dense granule secretion in response to strong agonists, stabilization of platelet aggregates by contributing to the activation of αIIbβ3, and inhibition of the antiplatelet effects of prostacyclin. Despite its proven clinical efficacy, clopidogrel has several major drawbacks that would limit it use during the vulnerable period for post-operative pediatric cardiac patients. These include the requirement for oral administration that may result in erratic absorption particularly in bypass cases, delay in the onset of action due to the need for conversion of the pro-drug to an active metabolite, and irreversible inhibition of $P2Y_{12}$ that would necessitate platelet transfusion(s) if bleeding occurred Interestingly, a previous clinical trial evaluating clopidogrel therapy in infants with cyanotic congenital heart disease palliated with a systemic-to-pulmonary-artery shunt failed to show any benefit in reducing the rate of death or shunt-related morbidity in drug treated patients. In the majority of cases, patients were also receiving aspirin therapy at the time of administration of clopidrogrel. Of note, clopidrogrel is a prodrug that requires metabolism by the liver to generate its active form, which was unknown at the time that study was performed. It is also an irreversible inhibitor of the P2Y12 receptor. Target value for platelet inhibition in that trial was ~30% as determined by LTA. One major conclusion drawn from this study was that platelets from these young patients might be less responsive to agonists such as ADP as evidenced by the lower dose of clopidrogrel needed to achieve similar levels of inhibition of platelet aggregation using LTA as compared to adults. This suggested that the P2Y12 signaling pathway may be developmentally regulated and/or of less importance in supporting thrombus generation in this population as compared to adults.

Cangrelor, an adenosine triphosphate (ATP) analogue, is a P2Y12 receptor antagonist given intravenously with properties more suitable for short-term use, which include a rapid, direct, predictable, and reversible inhibition of platelet function. It does not require conversion to an active form as compared to clopidogrel. It has a half-life of 3 to 6 minutes in adults with restoration of hemostasis, as assessed by bleeding time, seen within 10 minutes of cessation of infusion of a supratherapeutic dose and full platelet function recovery within 60 minutes as determined by response to ADP.

The alternatives forms and salts of cangrelor, processes for their production, and pharmaceutical compositions comprising them, are well known in the art and set forth, for example, in U.S. Pat. No. 5,721,219. Additional disclosure relevant to the production and use of cangrelor may be found in U.S. Pat. Nos. 5,955,447; 6,130,208; 6,114,313; 8,680,052; 759,316; 9,295,687; 9,427,448; 9,439,921; and 9,700,575.

Cangrelor is also rapidly inactivated by dephosphorylation to the nucleoside. On the basis of these characteristics, it was selected for clinical development as an IV antithrombotic agent and has recently been approved by the FDA for use in adults undergoing PCI.

Cangrelor may also have value as a potential bridging agent to oral therapy in neonates with cyanotic congenital heart disease who require palliation with a systemic-to-pulmonary-artery shunt.

Despite advances in adjunctive pharmacotherapy, there remains an urgent need for pharmacologic protection prior to the administration of an oral antiplatelet agent in order to minimize the period immediately after surgery during which patients, in particular the pediatric patients, are vulnerable to an acute thrombotic event (ATE).

We provide a pharmaceutical composition comprising a $P2Y_{12}$ inhibitor as antiplatelet agents for use in preventing and/or treating thrombosis, having pharmacological properties that are well suited for critically ill pediatric and pediatric patients with congenital heart disease requiring thromboprophylaxis.

SUMMARY OF THE INVENTION

The present invention is directed to a use of cangrelor in the treatment and/or prevention of shunt thrombosis in patients suffering congenital heart disease. Additionally, the present invention is directed to the use of cangrelor in the treatment and/or prevention of shunt or stent thrombosis in pediatric patients undergoing shunt surgery or stent implantation respectively. Another aspect of the invention provides a pharmaceutical composition comprising cangrelor for use in patients suffering congenital heart disease undergoing shunt surgery.

Another aspect of the invention provides a pharmaceutical composition comprising cangrelor for use in the treatment and/or prevention of shunt thrombosis in patients undergoing shunt surgery wherein the shunt surgery is selected from the group including systemic-to-pulmonary artery shunt, Blalock-Taussing shunt, central shunt, or right ventricle to pulmonary artery palliative shunts.

Another aspect of the invention provides a pharmaceutical composition comprising cangrelor for use in patients undergoing systemic-to-pulmonary artery shunt surgery.

Another aspect of the invention provides a pharmaceutical composition comprising cangrelor for use in the treatment and/or prevention of shunt or stent thrombosis in pediatric patients suffering congenital heart disease.

Another aspect of the invention provides a pharmaceutical composition comprising cangrelor for use in the treatment and/or prevention of shunt or stent thrombosis in pediatric patients undergoing shunt surgery or stent implantation surgery.

Another aspect of the invention provides a pharmaceutical composition comprising cangrelor for use in pediatric patients undergoing shunt surgery or stent implantation wherein the shunt surgery or stent implantation is selected from the group including systemic-to-pulmonary artery shunt, Blalock-Taussing shunt, central shunt, right ventricle to pulmonary artery palliative shunts, or ductus arterious stents.

Another aspect of the invention provides a pharmaceutical composition comprising cangrelor for use in pediatric patients wherein the pediatric patients suffer single ventricle physiology palliated with systemic-to-pulmonary artery shunt.

Another aspect of the invention provides a pharmaceutical composition comprising cangrelor for use in the treatment and/or prevention of shunt or stent thrombosis wherein the administration is intravenous. The patient population for shunt thrombosis prevention and/or treatment is adult and pediatric patients, including neonate. The patient population for stent thrombosis prevention and/or treatment is pediatric patients, including neonates.

Another aspect of the invention provides a pharmaceutical composition comprising cangrelor for use in the treatment and/or prevention of shunt or stent thrombosis wherein the method comprises:
  i) performing the shunt surgery or stent implantation;
  ii) administering the composition comprising cangrelor after surgery.

Another aspect of the invention provides a pharmaceutical composition comprising cangrelor wherein the composition is administered as a bolus, or as a continuous infusion, or as a bolus followed by a continuous infusion, or as a continuous infusion followed by a bolus.

Another aspect of the invention provides a pharmaceutical composition comprising cangrelor for the above indications, wherein the amount of cangrelor administered as continuous infusion is between about 0.1 and about 4 µg/kg/min. Preferably, the amount of cangrelor is between about 0.1 and 1.5 µg/kg/min, more preferably between about 0.1 and 1 µg/kg/min, even more preferably from about 0.1 and 0.5 µg/kg/min, where still more preferred amount is between about 0.1 and 0.3 µg/kg/min.

Another aspect of the invention provides a pharmaceutical composition comprising cangrelor for use as a bridging agent to oral antiplatelet therapies in pediatric patients undergoing shunt surgery or stent implantation.

Another aspect of the invention provides a pharmaceutical composition comprising cangrelor for use as a bridging agent to oral antiplatelet therapies in pediatric patients undergoing shunt surgery or stent implantation wherein the shunt surgery or stent implantation is selected from the group including systemic-to-pulmonary artery shunt, Blalock-Taussing shunt, central shunt, right ventricle to pulmonary artery palliative shunts or ductus arterious stents.

Another aspect of the invention provides a pharmaceutical composition comprising cangrelor for use as a bridging agent to oral antiplatelet therapies in pediatric patients undergoing shunt surgery or stent implantation, wherein the administration comprises:
  i) administering a continuous infusion of cangrelor after shunt surgery or stent implantation for at least one hour or longer;
  ii) discontinuing the treatment with cangrelor;
  iii) administering the oral antiplatelet therapy.

Another aspect of the invention provides a pharmaceutical composition comprising cangrelor for use as a bridging agent wherein the continuous infusion of cangrelor is preferably carried out at a dosage as above defined.

Another aspect of the invention provides a pharmaceutical composition comprising cangrelor for use in preventing acute stent thrombosis in patients undergoing orthotopic heart transplant.

Another aspect of the invention provides a method of preventing shunt thrombosis in high risk pediatric patients undergoing systemic-to-pulmonary artery shunt surgery.

Another aspect of the invention is a method of preventing shunt thrombosis in a high risk patient undergoing systemic-to-pulmonary artery shunt surgery, the method comprising:
  i) performing systemic-to-pulmonary artery shunt surgery and
  ii) administering cangrelor immediately after surgery.

The high risk patient preferably is a pediatric patient, most preferably a neonate.

DETAILED DESCRIPTION OF THE DRAWINGS

FIG. 4. IC50 curves for cangrelor using LTA and a microfluidic device. Concentration response curves for the determination of IC50 values for 20 µM ADP (A-D) and 5 µM ADP (E-H) as measured by LTA using purified platelets from pediatric and pediatric patients with congenital heart disease or healthy adult volunteers in the presence of fibrinogen. Data represent the mean±SEM. n=4-6 individuals for each concentration of antagonist tested. I-J, Concentration response curves for cangrelor under flow conditions. A microfluidic device containing a thrombogenic surface of collagen was used to determine IC50 values for cangrelor added to PPACK-treated whole blood from pediatric patients with single ventricle physiology (n=4; 38 separate clotting events) or healthy adults (n=7; 56 separate clotting events). Data represent the mean±SEM.

FIG. 6. Effect of cangrelor on human platelet thrombus formation in avatar mice. Time course of the average size of thrombi formed (A-D) and maximal thrombus size obtained (E) in laser-injured arterioles of VWFHA1 mutant mice pre- and post-administration of cangrelor (same animal). The effects of the αIIbβ3 inhibitor abciximab (0.25 µg/kg bolus; 0.125 µg/kg/min infusion) are shown for comparison (n=3 independent experiments for each age group). Each symbol (E) represents the area of a thrombus in 1 arteriole of a mouse. Results for cangrelor are the mean±SEM of 8 independent experiments performed for each age group of pediatric patients with CHD or healthy adult volunteers. F, Percent change in thrombus size in response to cangrelor treatment based on data shown in E. Data are from represent mean±SEM.

DETAILED DESCRIPTION OF THE INVENTION

The present invention is directed to use of cangrelor for preventing and/or treating shunt thrombosis in a patient suffering congenital heart disease. In one embodiment, the patients are pediatric patients having cyanotic heart diseases.

The invention is thus directed to the use of cangrelor for preventing and/or treating shunt or stent thrombosis in a high-risk patient undergoing surgery for placement of palliative shunts or implantation of a stent. Typically, the surgery includes the placement of systemic to pulmonary shunts, Blalock-Taussing shunt, central shunts, right ventricle to pulmonary artery palliative shunts or ductus arterious stents. Advantageously according to the method of the present invention, the cangrelor is administered after surgery according to the above preferred embodiments, thus reducing the risk of acute thromboembolic events, particularly in pediatric patients.

As before reported, the patients undergoing the above mentioned shunt surgery or stent implantation, are at a high risk for thrombotic complications such as, without limitation, acute shunt occlusion, which remains a major source of morbidity and mortality.

It has to be noted that the well known and widely used aspirin therapy may help in reducing the risk of shunt occlusion, but it is typically not administered until 12 to 24 hours after surgery; therefore there is a vulnerable period immediately after surgery or implantation up to the administration of aspirin wherein the risk of onset of acute thromboembolic events is not managed. To date, there are no other antiplatelet therapies available that possess the desired characteristics of cangrelor, which include i.v. administration, rapid onset, rapid reversibility, and a form that does not require metabolic transformation for blockade of the P2Y12 receptor. These characteristics are ideal for this patient population that are both high risk for clot formation and bleeding in the early post-operative period.

The method of the present invention provides an efficacious method of treatment and/or prevention of thrombotic complications, particularly in pediatric patients, said method comprising the administration of cangrelor, shortly after the termination of the surgery, and in another embodiment, also in combination with an oral antiplatelet therapy. According to the invention, cangrelor is preferably administered intravenous by continuous infusion at a dosage, as above detailed, which is well suited, tolerated and safe also for pediatric patients.

In particular, the invention is directed to the use of cangrelor for prevention and/or treatment of shunt thrombosis in a high risk pediatric patients have single ventricle physiology undergoing systemic-to-pulmonary artery shunt surgery.

DEFINITIONS

In each aspect of the present invention, the term "cangrelor" encompasses the compound of Formula 1, as well as tautomeric, enantiomeric and diasteromeric forms thereof, and racemic mixtures thereof, and pharmaceutically acceptable salts of these compounds, including a tetrasodium salt.

Formula I

In the present application, unless otherwise provided, the definition of pediatric patients includes individuals from birth to about 18 years, or a length-based weight (per Broselow Tape) of 36 kg or less. Patients who are known to be less than about 18 years of age but whose weight exceeds 36 kg may still be considered pediatric patients given their chronological age; however weights will then need to be estimated and adult dosages should be used. Thus, the pediatric patients includes e.g.: newborns up to about the first 28 days of life; newborns up to about 12 months; pediatric patients from: up to about 18 years; about 1 to about 3 years, from about 3 to about 5 years, from about 6 to about 10 years, from about 11 to about 14 years, and from about 14 to about 18 years.

Congenital heart defects (CHD) or congenital heart disease (CHD) are structural problems arising from abnormal formation of the heart or major blood vessels. At least 18 distinct types of congenital heart defects are recognized, with many additional anatomic variations. The word "congenital" means existing at birth. Congenital heart defects may be cyanotic or acyanotic.

Examples of common type of congenital heart disease are, but are not limited to: Aortic Valve Stenosis (AVS), Atrial Septal Defect (ASD), Coarctation of the Aorta (CoA), Complete Atrioventricular Canal defect (CAVC), d-Transposition of the Great Arteries, Ebstein's Anomaly, Hypoplastic Left Heart Syndrome, l-Transposition of the Great Arteries, Patent Ductus Arteriosus (PDA), Pulmonary Atresia, Pulmonary Valve Stenosis, Single Ventricle Defects, Tetralogy of Fallot, Total Anomalous Pulmonary Venous Connection (TAPVC), Tricuspid Atresia, Truncus Arteriosus, and Ventricular Septal Defect (VSD).

In the present description, unless otherwise provided, the definition of shunt surgery includes, but is not limited to: systemic-to-pulmonary artery shunts, Blalock-Taussing shunts, central shunts, or right ventricle to pulmonary artery palliative shunts.

In the present description, unless otherwise provided, the definition of stent implantation or stent surgery includes, but is not limited to ductus arterious stents.

DETAILED DESCRIPTION

In one aspect, the present invention demonstrates by means of standard LTA, high throughput microfluidic devices, and novel biological platforms that cangrelor is effective in preventing and treating thrombus formation in high risk pediatric populations suffering from congenital heart disease.

Platelet response to ADP and cangrelor was nearly identical for all age groups tested (P>0.05) based on calculated EC50 and IC50 values obtained by LTA.

The in vitro potency of cangrelor was further evaluated using whole blood from pediatric patients with single ventricle physiology and high throughput microfluidic assays, which yielded similar IC50 values. Consistent with these findings was the observation that platelets from pediatric patients expressed similar levels of the P2Y12 receptor as their adult counterparts.

To demonstrate the therapeutic utility of cangrelor in a biologically relevant model of thrombosis, we also evaluated the in vivo behavior of platelets from neonates and older patients with congenital heart disease in laser-injured arterioles of avatar mice (mice that have been genetically modified to support human platelet mediated hemostasis and thrombosis) before and immediately after drug administration. In all cases, cangrelor given at doses recommended for percutaneous coronary intervention (per 1 kg of body weight) reduced thrombus size by >45% thereby preventing vessel occlusion (P<0.0001).

To demonstrate the potential clinical utility of cangrelor, we first assessed the reactivity of platelets from neonates with cyanotic congenital heart disease, and in particular the contribution of the $P2Y_{12}$ receptor in supporting aggregation and thrombus formation.

By using standard as well as novel in vitro and in vivo based technologies, there were no significant differences in platelet response to either ADP-induced aggregation or cangrelor-mediated $P2Y_{12}$ receptor blockade for neonates and older pediatric patients with congenital heart disease as compare to healthy adults. In fact, $EC_{50}$ and $IC_{50}$ values, respectively, were nearly identical as determined by LTA using purified platelets.

As demonstrated in the present Experimental section, platelets from pediatric patients with cyanotic congenital heart disease have a nearly identical response to ADP and $P2Y_{12}$ receptor blockade as their adult counterparts. Cangrelor may prove to be an effective antithrombotic drug with pharmacological properties well suited for use in the immediate post-operative period for neonates palliated with a systemic-to-pulmonary artery shunts.

Although ex-vivo technologies such as flow cytometry, aggregometry, and microfluidic devices can yield important information concerning pediatric platelet function and drug response, they cannot fully replicate the complex adhesion and activation events critical for thrombus formation on the arterial side of the circulation. To address this issue, we utilized an avatar mouse model that better reflects the intravascular environment in humans by permitting human but not mouse platelets to support biologically relevant interactions at sites of vascular injury.

In fact, the power of this biological platform in assessing the antithrombotic properties of $P2Y_{12}$ inhibitors such as the thienopyridine derivative clopidogrel, was accomplished by evaluating the ability of platelets isolated from drug treated adults to support thrombus formation in laser-injured arterioles of these animals. Consistent with this dependency on the $P2Y_{12}$ receptor for maximal thrombus generation was the ability of cangrelor to limit the ability of platelets from neonates and older pediatric patients with congenital heart disease to support clot growth and vessel occlusion. Advantageously, cangrelor did not completely prevent platelet accumulation at sites of arteriole injury as compared to integrin αIIbβ3 inhibitor abciximab, which nearly abrogated platelet-vessel wall interactions.

A previous clinical trial evaluating the $P2Y_{12}$ inhibitor clopidogrel in infants with cyanotic congenital heart disease palliated with a systemic-to-pulmonary artery shunt failed to demonstrate any significant reduction in either mortality from any cause or shunt-related morbidity.

In addition to the prevention of shunt thrombosis, there may be other indications for the use of cangrelor in this high risk population. Despite an overall improvement in survival after a multistage palliative repair for hypoplastic left heart syndrome, patients may ultimately require an orthotopic heart transplant. However, it has been reported that as many as 25% of transplant patients will develop cardiac allograft vasculopathy necessitating coronary artery revascularization and stent placement as a short-term palliative solution. In fact, a recent study has suggested that PCI can be performed safely and effectively in this patient population, and has value as part of an evolving strategy to improve outcomes prior to re-transplantation. Cangrelor, which has been shown to significantly reduce ischemic events during PCI in adults with coronary artery disease without significantly increasing the risk of severe bleeding, may play a role in preventing acute stent thrombosis in these patients as well.

In one embodiment, the present invention is directed to the use of cangrelor for the treatment and/or prevention of acute stent thrombosis in pediatric patients undergoing or who have undergone orthotopic heart transplant. These patients typically need coronary artery revascularization and stent placement as a short-term palliative solution.

Given that shunt thrombosis remains a major cause of morbidity and mortality and that patients are at highest risk during the initially palliation for single ventricle physiology, we herein surprisingly present preclinical evidence that the non-thienopyridine $P2Y_{12}$ inhibitor cangrelor may fill a critical therapeutic void in thromboprophylaxis. This is justified based on the results reported in the present invention, demonstrating that platelets from pediatric patients with cyanotic congenital heart disease have a robust response to ADP and are surprisingly as amenable to $P2Y_{12}$ inhibition with cangrelor as their adult counterparts. Moreover, these findings are not restricted to pediatric shunt patients but appear to be independent of age and type of cardiac lesion.

Unique to this study is the ability to establish the in vivo efficacy of cangrelor using an avatar mouse model that permits the evaluation of human platelet interactions with the injured vessel wall, thus demonstrating that this $P2Y_{12}$ inhibitor yields the intended biological response.

Figure 7:
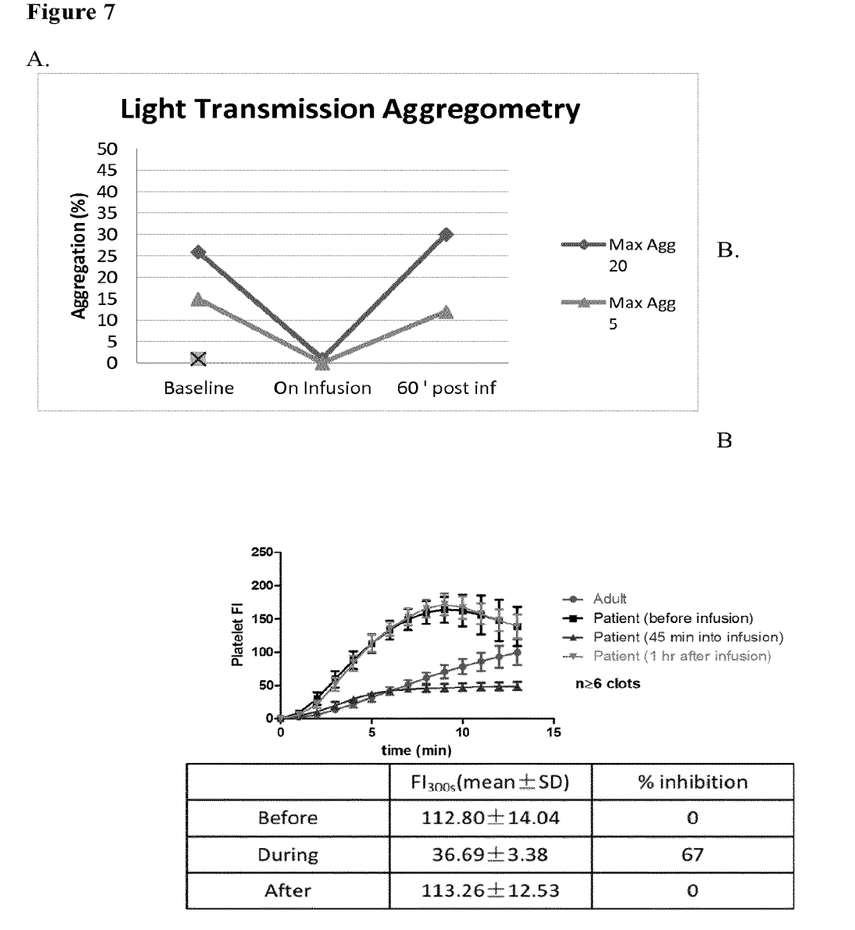
FIG. 7. Pharmacodynamic properties of cangrelor administered to neonates with CHD in the early post-operative period. A phase 1 clinical trial is currently being conducted to assess the drug plasma levels and effects on platelet aggregation using LTA and microfluidics. A, representative LTA results from a post-operative neonate with shunt placement 1 h prior to receiving cangrelor, 15 minutes prior to the end of the infusion (0.5 microgram/kg/min for 1 h), and 1 h after stopping the infusion of cangrelor. B, microfluidic results under the same conditions as outlined for LTA. Results are compared to a healthy adult who did not receive cangrelor.

In addition, in vitro data obtained from a phase 1 PK/PD clinical trial involving the infusion of cangrelor at 0.5 µg/kg/min or 0.25 µg/kg/min for one hour in post-operative neonates with CHD that required palliation with a systemic to pulmonary artery shunt demonstrated both the efficacy and rapid reversibility of cangrelor as assessed by LTA and microfluidics (FIG. 7).

The above nonclinical and clinical studies provide compelling evidence for an efficacious use of cangrelor in the prevention and/or treatment of shunt or stent thrombosis in patients suffering congenital heart disease who require palliation with a systemic to pulmonary artery shunt.

It is understood that all preferred groups or embodiments of the present invention described above may be combined with each other and apply as well mutatis mutandis.

In one aspect, the invention provides the use of cangrelor in the prevention and/or treatment of shunt thrombosis in patients suffering congenital heart disease undergoing shunt surgery. The treatment and/or prevention of shunt thrombosis in high risk patients undergoing shunt surgery comprises performing shunt surgery and administering cangrelor immediately after surgery.

In another aspect, the invention provides the use of cangrelor for the prevention and/or treatment of shunt or stent thrombosis in pediatric patients with cyanotic congenital heart disease palliated with a systemic-to-pulmonary artery shunt, Blalock-Taussing shunt, central shunt, right ventricle to pulmonary artery palliative shunts, and ductus arterious stents, wherein the pediatric patients are at high risk for thrombotic complications. The thrombotic complications or acute thromboembolic events such as acute shunt occlusion remain a major source of morbidity and mortality.

In a preferred embodiment, the invention provides the use of cangrelor for prevention and/or treatment of shunt thrombosis in a high risk pediatric patients undergoing systemic-to-pulmonary artery shunt surgery. The pediatric patients have single ventricle physiology.

In another aspect, the invention provides the use of cangrelor for prevention and/or treatment of stent thrombosis in a high risk pediatric patients palliated with a ductus arterious stents.

In another aspect, the invention provides the use of cangrelor to reduce the incidence and/or prevent the mortality in high-risk patients undergoing a shunt surgery, wherein mortality may be associated with acute thrombotic events. The high-risk patients are pediatric patients with congenital heart disease. In particular, the pediatric patients have single ventricle physiology.

In another aspect, the invention provides the use of cangrelor to reduce the incidence and/or prevent the mortality in high-risk pediatric patients undergoing a stent surgery, wherein mortality may be associated with acute thromboembolic events. The high-risk patients are pediatric patients with congenital heart disease.

The invention also provides pharmaceutical composition comprising cangrelor for the administration once or according to a dosing regimen wherein a number of doses are administered at varying intervals of time for a given period of time.

Administration of pharmaceutical compositions comprising cangrelor may be accomplished according to patient needs, for example oral, sublingual, intranasal, intraocular, rectal, transdermal, mucosal, topical or parenteral administration. Parenteral modes of administration include without limitation, intradermal, subcutaneous (s.c., s.q., sub-Q, Hypo), intramuscular (i.m.), intravenous (i.v.), intraperitoneal (i.p.), intra-arterial, intramedulary, intracardiac, intra-articular (joint), intrasynovial (joint fluid area), intracranial, intraspinal, and intrathecal (spinal fluids).

Any known device useful for parenteral injection or infusion of drug formulations can be used in the methods of the present invention.

In a preferred embodiment of the invention, the administration is via parenteral, more preferably intravenous administration, via a peripheral IV or central venous line.

When administered intravenously, the pharmaceutical composition comprising cangrelor may be administered as a bolus, as a continuous infusion, as a bolus followed by a continuous infusion, or as a continuous infusion followed by a bolus.

In one embodiment the invention provides a pharmaceutical composition comprising cangrelor wherein the point in time when the pharmaceutical composition is administered is between about a half an hour and about 24 hours from the termination of the shunt surgery or stent implantation, such as at least about half an hour, about 1 hour, about 2 hours, about 3 hours, about 4 hours, about 5 hours, about 6 hours, about 7 hours, about 8 hours, about 9 hours, and about 10 hours or longer from the termination of the shunt surgery or stent implantation. Preferably, the administration is after at least about 1 hour, more preferably in a period of time comprised between about 2 and about 4 hours from the termination of the shunt surgery or stent implantation.

Preferably, the pharmaceutical composition comprising cangrelor is administered as continuous infusion. For example, the pharmaceutical composition according to the invention may be administered after the shunt surgery or stent implantation as a continuous infusion for at least about 10 minutes to about 72 hours. Preferably, the administration continues for at least about 1 hour, about 2 hours, about 3 hours, about 4 hours, about 5 hours, about 6 hours, about 7 hours, about 8 hours, about 9 hours, or about 24 hours or longer. More preferably, the infusion continues for at least about 10 minutes to about 2 hours; still more preferably, the infusion continues for at least one hour, or for a short period of time such as less than about an hour, such as about 15 minutes, about 30 minutes or about 45 minutes depending for example on the dosage, the age or the weight of the patients.

When the pharmaceutical composition comprising cangrelor is administered as a bolus,
it is administered within a short period of time, such as about two minutes or less, or about one minute or less, after shunt surgery or stent implantation.

In one aspect of the present invention, cangrelor can be administered before, during, and/or after shunt surgery or stent implantation.

When administered as a bolus, cangrelor is administered at dosage between about 5 µg/kg and about 100 µg/kg, preferably between about 5 µg/kg and about 40 µg/kg, even more preferably between about 10 µg/kg and about 35 µg/kg, still more preferably between about 10 µg/kg and about 30 µg/kg. For example, the pharmaceutical composition comprising cangrelor is administered at about 5 µg/kg, about 10 µg/kg, about 15 µg/kg, about 20 µg/kg, about 25 µg/kg, or about 30 µg/kg.

In one embodiment, an intravenous dose of up to about 4 microgram/kg/min, can be administered about 2 to about 4 h after shunt surgery or stent implantation and continued until the preferred time of administration of an oral agent.

The composition may be administered once, twice, thrice or more times a day.

In a further embodiment, the pharmaceutical composition comprising cangrelor is administered once the acute thromboembolic event is recognized or diagnosed, or at the onset of symptoms of the acute thromboembolic event.

For example, the pharmaceutical composition may be administered when symptoms of acute thromboembolic event are observed. The pharmaceutical composition is administered within a short period of time from the onset of symptoms of acute thromboembolic event.

The short period of time may range from about one or about two minutes to about one or about two hours.

In some embodiments, the method comprises administering the pharmaceutical
composition comprising cangrelor as a prophylaxis against an acute thromboembolic event.

Patients appropriate for such prevention include pediatric cardiac subjects who are undergoing shunt surgery or stent implantation for placement of systemic-to pulmonary artery palliative shunts (e.g., Blalock-Taussig or central shunt), right ventricle to pulmonary artery palliative shunts, or ductus arteriosus stents who are at risk of thrombotic events after repair of structural congenital heart disease.

In another aspect, the present invention provides the administration of pharmaceutical composition comprising cangrelor for the treatment of shunt or stent thrombosis in pediatric patients undergoing stent implantation or shunt surgery concurrently or sequentially (before or after) with at least one additional therapeutic agent.

The additional therapeutic agent may be, for example without limitation, a $P2Y_{12}$-receptor inhibitor such as an oral P2Y12-receptor inhibitor, a glycoprotein IIb/IIIa inhibitor, aspirin and heparin. Administering an oral antiplatelet therapies, either concurrently or sequentially with the pharmaceutical composition comprising cangrelor in pediatric patients undergoing shunt surgery or stent implantation may also transition the patient to chronic or maintenance treatment with the antiplatelet inhibitor.

As mentioned above, the present invention also provides the use of cangrelor as a bridging agent to oral antiplatelet therapies in pediatric patients requiring a palliative systemic-to-pulmonary artery shunt, Blalock-Taussing shunt, central shunt, right ventricle to pulmonary artery palliative shunt or ductus arterious stent.

In one embodiment, the cangrelor is useful for transitioning pediatric patients from administration of cangrelor after shunt surgery or stent implantation to administration of a chronic or maintenance treatment with oral antiplatelet therapies, i.e. oral P2Y12, or aspirin.

In a preferred embodiment, the pharmaceutical composition comprising cangrelor is administered in a method comprising:
  i) administering a continuous infusion of cangrelor after shunt surgery or stent implantation for at least half an hour to about 72 hours;
  ii) discontinuing the treatment with cangrelor; and
  iii) administering the oral antiplatelet therapy.

In a further embodiment, the use of cangrelor in a method for transitioning pediatric patients from administration of cangrelor after shunt surgery or stent implantation to administration of a chronic or maintenance treatment with oral antiplatelet therapies includes a continuous infusion of cangrelor after shunt surgery or stent implantation at a dosage according to the above indicated preferred ones.

Cangrelor can be administered alone or combined with various pharmaceutically acceptable excipients.

The pharmaceutical composition of the present invention comprises cangrelor, and may further comprise one or more pharmaceutically acceptable excipients.

These pharmaceutical compositions may comprise one or more pharmaceutically acceptable excipients including, but not limited to, carriers, diluents, stabilizing agents, solubilizing agents, surfactants, buffers, antioxidants, preservatives, tonicity agents, bulking agents, lubricating agents, emulsifiers, suspending or viscosity agents, filters, disintegrating agents, binding agents, wetting agents, lubricating agents, antibacterials, antibiotics, antifungals, chelating agents, sweeteners, perfuming agents, flavoring agents, coloring agents, administration aids, and combinations thereof.

Particular excipients include, but are not limited to, cornstarch or gelatin, lactose, sucrose, dextrose, microcrystalline cellulose, kaolin, mannitol, sorbitol, dicalcium phosphate, sodium chloride, alginic acid, croscarmellose sodium, sodium starch glycolate, glycerol, ethanol, propylene glycol, polysorbate 80 (Tween-80™), poly(ethylene)glycol 300 and 400 (PEG 300 and 400), PEGylated castor oil (e.g. Cremophor EL), poloxamer 407 and 188, cyclodextrin or cyclodextrin derivatives (including HPCD ((2-hydroxypropyl)-cyclodextrin) and (2 hydroxyethyl)-cyclodextrin), hydrophilic and hydrophobic carriers, and combinations thereof.

Hydrophobic carriers include, for example, fat emulsions, lipids, PEGylated phospholipids, polymer matrices, biocompatible polymers, lipospheres, vesicles, particles, and liposomes. In certain embodiments, the pharmaceutical compositions may comprise polyols, such as sorbitol, lactose, sucrose, inositol or trehalose.

The pharmaceutical compositions of the present invention may be formulated for the route by which they are administered to the patients, which include solids, liquids, and suspensions. For example, if the pharmaceutical composition is formulated for IV administration, the pharmaceutical composition may comprise an intravenous fluid, which includes, but is not limited to, water-for-injection (WFI), physiological saline, 0.9% NaCl, phosphate buffered saline, 5% dextrose in water, and 0.002% polysorbate 80 in water or Ringer's™ solution.

Such compositions may comprise cangrelor in an amount of about comprised between 0.10 and 200 µg/mL.

If the pharmaceutical composition is formulated for intramuscular administration, the pharmaceutical composition may comprise an intravenous fluid, which includes, but is not limited to, WFI, physiological saline, 0.9% NaCl, phosphate buffered saline, and 5% dextrose in water.

If the pharmaceutical composition is formulated for oral administration, the pharmaceutical composition may comprise excipients that include, but are not limited to diluents (e.g., sodium and calcium carbonate, sodium and calcium phosphate, and lactose), binding agents (e.g., acacia gum, starch, gelatin, sucrose, polyvinylpyrrolidone (Povidone), sorbitol, tragacanth, methylcellulose, sodium carboxymethylcellulose, hydroxypropyl methylcellulose, and ethylcellulose), fillers (e.g., calcium phosphate, glycine, lactose, maize-starch, sorbitol, or sucrose), wetting agents, lubricating agents (e.g., metallic stearates, stearic acid, polyethylene glycol, waxes, oils, silica and colloidal silica, silicon fluid or talc), disintegrating agents (e.g., potato starch, corn starch and alginic acid), flavouring agents (e.g. peppermint, oil of wintergreen, fruit flavoring, bubblegum, and the like), and coloring agents.

Excipients may also include coatings such as glyceryl monostearate or glyceryl distearate, to delay absorption in the gastrointestinal tract. For oral use, the pharmaceutical composition may be made in the form of a tablet, capsule, suspension or liquid syrup or elixir, wafers and the like.

The pharmaceutical compositions of the present invention may be prepared by admixing cangrelor with the one or more pharmaceutically acceptable excipients. Methods of admixing and devices useful for admixing are known in the art.

In certain embodiments, cangrelor and the one or more pharmaceutically acceptable excipients are dissolved and then admixed. The resulting mixture may be dried, such as through lyophilization, to form a solid pharmaceutical composition, or the resulting mixture may remain in solution form as a liquid pharmaceutical composition. In some embodiments, the solid pharmaceutical composition may be solubilized in an intravenous fluid before administration, for example, as a bolus or infusion.

In some embodiments, the pharmaceutical composition is prepared by dissolving and admixing cangrelor, mannitol, sorbitol, and optionally sodium hydroxide, and then lyophilizing the mixture. Prior to administration, the lyophilized mixture is dissolved in an intravenous fluid such as WFI or physiological saline.

The following examples illustrate the invention, without any limitation.

EXPERIMENTAL PART

Methods

Reagents

ADP and type 1 collagen (ChronoPar) were obtained from Chronolog (Havertown, PA). Human fibrinogen was purchased from Sigma Co. (Saint Louis, MO) and abciximab (ReoPro) from Centocor, Inc (Marvin, PA). The polyclonal anti-VWF antibody and Alexa 488 conjugated antihuman CD61 (GPIIIa) antibody were purchased from Dako (Carpinteria, CA) and Bio-Rad (Raleigh, NC; clone Y2/51), respectively. MAb 6D1 (function blocking antibody to human GPIbα) and cangrelor (P2Y12 inhibitor) were kindly provided by Barry Coller (Rockefeller University, NY) and The Medicine Company (Parsippany, NJ).

Mice $VWF^{HA1}$ mutant animals were generated and backcrossed 10 generations on a 129/SvJ background as previously described. All procedures performed on animals were approved by The Institutional Animal Care and Use Committees at Columbia University Medical Center.

Patient Population

Blood samples from 78 patients with CHD (neonates to 18 years) and healthy adults were collected to assess platelet reactivity and response to cangrelor using light transmission aggregometry (LTA), collagen-coated multichannel microfluidic devices, and genetically modified mice that support human but not mouse platelet-mediated thrombosis (avatar mouse).

Patients were eligible for enrollment in the study if they were 0 to 18 years of age and with known congenital heart disease. Exclusion criteria included coagulation defects, known congenital or genetic conditions expected to affect platelet function, body weight<3 kg for pediatric patients and <6 kg for older pediatric patients, cardiopulmonary instability necessitating urgent or emergent surgical/catheter-based intervention, medications or other conditions that might significantly affect platelet function.

Seventy-eight pediatric patients with congenital heart disease were enrolled in this study. Three different study population groups were chosen (Table 1).

TABLE 1

Baseline Demographic Characteristics of Cardiac Patients

| Baseline Characteristics | 0-28 days | 1-10 years | 11-18 years |
|---|---|---|---|
| No. | 39 | 31 | 8 |
| Mean age | 12.8 | 4.1 | 15.3 |
| Female, % patients | 23.1 | 54.8 | 37.5 |
| Ethnicity, % patients | | | |
| Hispanic/Latino | 20.5 | 25.8 | 12.5 |
| Race, % patients | | | |
| White | 56.4 | 64.5 | 62.5 |
| Black | 7.6 | 6.5 | 12.5 |
| Asian | 15.5 | 3.2 | 12.5 |
| Native American | 0 | 0 | 0 |
| Other | 20.5 | 25.8 | 12.5 |
| Mean gestational age (weeks) | 38 | | |
| Diagnosis, % patients | | | |
| Hypoplastic left heart syndrome | 23.1 | 19.4 | 0 |
| Pulmonary atresia with intact ventricular septum | 0 | 3.2 | 0 |
| Tricuspid atresia | 0 | 6.5 | 0 |
| Transposition of great arteries | 33.3 | 12.9 | 0 |
| Tetralogy of Fallot | 2.6 | 19.4 | 25 |
| Double-inlet left ventricle | 5.1 | 3.2 | 0 |
| Double-outlet right ventricle | 0 | 3.2 | 12.5 |
| Coarctation | 12.8 | 3.2 | 12.5 |
| PDA | 0 | 12.9 | 0 |
| ASD | 0 | 0 | 25 |
| Heterotaxy | 7.7 | 0 | 0 |

Figure 1:
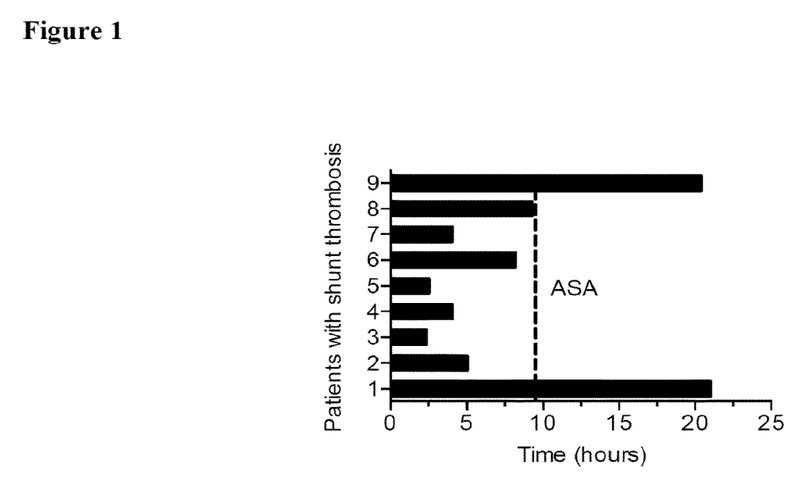
FIG. 1. Time from surgery to shunt occlusion in pediatric cardiac patients. The data represent postoperative in-hospital population from 2013 to 2015. Dotted line denotes the time aspirin (ASA) is typically given by enteral route.

The first included full-term neonates (0-28 days) with a body weight of ≥3 kg scheduled for cardiac surgery involving cardiopulmonary bypass. Of these, 56.4% were white, 7.6% were black, 15.5% were Asian, 20.5% were of Hispanic/Latino ethnicity, and 23.1% were female. Patients with single ventricle pathology accounted for 23.10% of the population enrolled in the study, with D-transposition of the great arteries accounting for the majority of patients (33.3%). During this period of time, ~23% of neonates requiring palliation with a systemic-to-pulmonary shunt had evidence of shunt occlusion necessitating a surgical intervention and/or rapid response ECMO. Interestingly, all events occurred within 24 hours of surgery with the majority of cases prior to initiation of aspirin therapy, FIG. 1.

The second group included pediatric patients ranging in age from 1-10 years (mean of 4.1 years) scheduled to undergo left heart catheterization for diagnostic or therapeutic purposes; the third group included adolescent patients ranging in age from 11-19 years (mean of 15.3 years) also undergoing left heart catheterization.

Blood Collection

For studies involving patients with congenital heart disease, blood was obtained from a central venous catheter after clearing the line of heparin; blood from healthy adult volunteers was obtained via routine venipuncture. In the majority of cases, 3.8% trisodium citrate served as anticoagulant. For microfluidic studies, whole blood was collected in a syringe containing the thrombin inhibitor H-D-Phe-Pro-Arg-chloromethylketone (PPACK, Calbiochem, San Diego, CA) to achieve a final concentration of 100 µM. Generation of PRP or purified platelets was performed by centrifugation as previously described.

Example 1

Platelet Aggregation Evaluation by Means of Light Transmission Aggregometry (LTA)

In this Example, platelet reactivity and response to cangrelor of pediatric patients and healthy adults was examined.

Purified platelets were suspended to a final concentration of 400,000/µl in platelet buffer containing 145 mM NaCl, 10 mM Hepes, 0.5 mM Na2HPO4, 5 mM KCl, 2 mM MgCl2, 1 mM CaCl2), 0.10% glucose, pH 7.4. Stock solutions of cangrelor were prepared on the day of experimentation and added to platelet suspensions (37γC, 1,200 rpm) 10 min prior to inducing aggregation with ADP (5 µM or 20 µM). Human fibrinogen (final concentration 200 µg/ml) was added to the platelet suspensions just prior to activation. Aggregation was assessed using a Chronolog Lumi-Aggregometer (model 540 VS, Chronolog, Havertown, PA) and permitted to proceed for 6 min after the addition of agonist. The results are reported as maximum percent change in light transmittance from baseline with platelet buffer used as a reference.

Results

Response of Platelets to ADP

Conflicting results exists regarding the overall reactivity of platelets from neonates with cyanotic congenital heart disease as compared to their healthy counterparts and adults, especially in response to physiologically relevant agonists such as ADP. It was also unclear whether platelets from this high risk population are as amenable to inhibition with antithrombotic drugs such the $P2Y_{12}$ receptor antagonists as those from adults.

Figure 2:
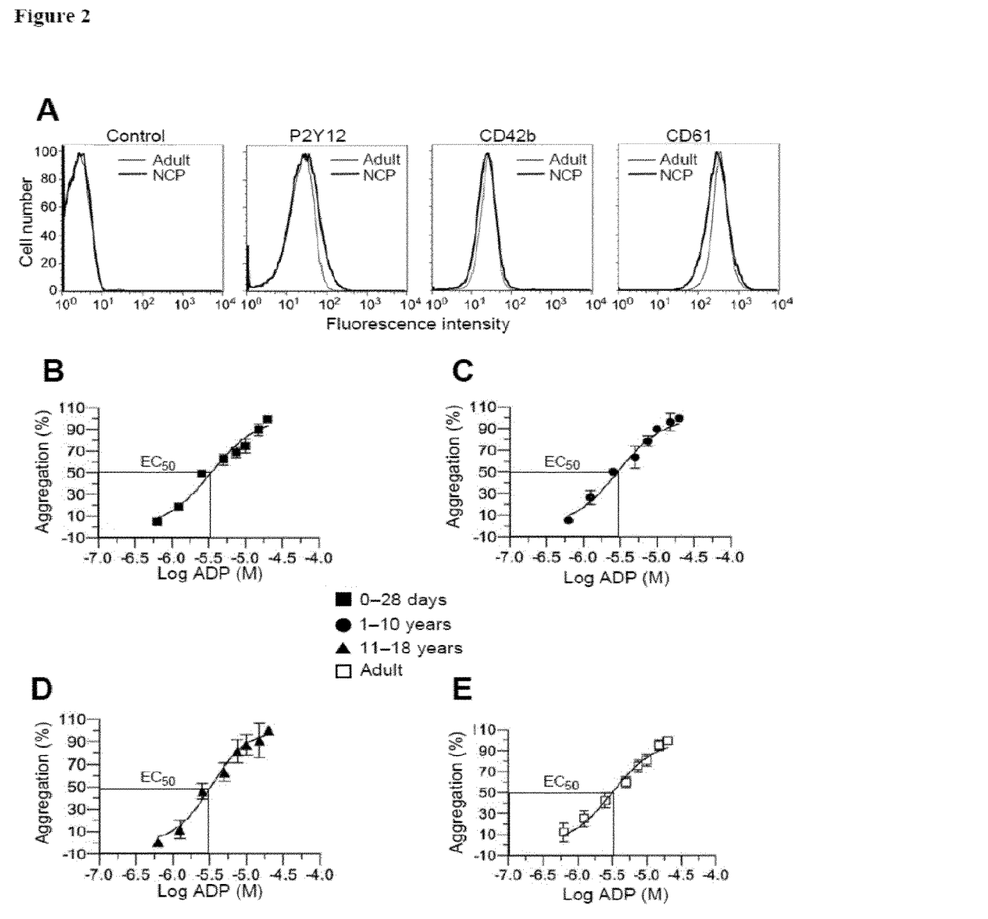
FIG. 2. P2Y12 receptor expression and ADP response of platelets. A representative flow cytometry histograms of antibody staining for the P2Y12 receptor on resting platelets isolated from pediatric cardiac patients (NCP) versus healthy adults (n=5 independent experiments). Histograms of antibody staining for GPIbα (CD42b) and integrin αIIbβ3 (CD61) are shown for comparison. B-E, Concentration response curves for the determination of EC50 values for ADP as measured by light transmission aggregometry (LTA) using purified platelets from pediatric and pediatric patients with congenital heart disease or healthy adult volunteers in the presence of fibrinogen. Results are the mean±SEM; n=4-6 individuals for each concentration of ADP tested.

To address these therapeutically relevant concerns, we first evaluated the level of expression of the $P2Y_{12}$ receptor on platelets isolated from neonates with cyanotic congenital heart disease. In comparison to platelets from adults, no discernible difference in $P2Y1_2$ surface expression was detected (FIG. 2A); similar results were obtained for the platelets receptors for VWF (GPIbα) and fibrinogen (αIIbβ3), which are indispensable for clot formation.

We next determine the functional response of platelets from neonates as well as older patients with congenital heart disease to ADP stimulation. This was accomplished by calculating $EC_{50}$ values for the agonist using isolated platelets in fibrinogen-supplemented buffer.

FIG. 2 (B through E) shows the mean (±SEM) percent platelet aggregation as a function of ADP concentration. Calculated $EC_{50}$ values were not significantly different for all age groups tested with mean values (±SEM) ranging from 2.9±0.1 µmol/L to 3.4±0.1 µmol/L (Table 2, P<0.001).

TABLE 2

$EC_{50}$ and $IC_{50}$ Values for ADP and Cangrelor, respectively

| Platelets | Adult | 0-28 days | 1-10 years | 11-18 years |
|---|---|---|---|---|
| $EC_{50}$ ± SEM (µmol/L) | 3.2 ± 0.2 | 3.4 ± 0.1 | 2.9 ± 0.1 | 3.2 ± 0.2 |
| $IC_{50}$ ± SEM* (nmol/L) | 0.82 ± 0.3 | 0.82 ± 0.2 | 0.79 ± 0.2 | 0.85 ± 0.2 |
| $IC_{50}$ ± SEM** (nmol/L) | 0.66 ± 0.3 | 0.74 ± 0.3 | 0.68 ± 0.3 | 0.76 ± 0.2 |

*20 µM ADP,
**5 µM ADP

Effect of Cangrelor on Platelet Aggregation

Figure 3:
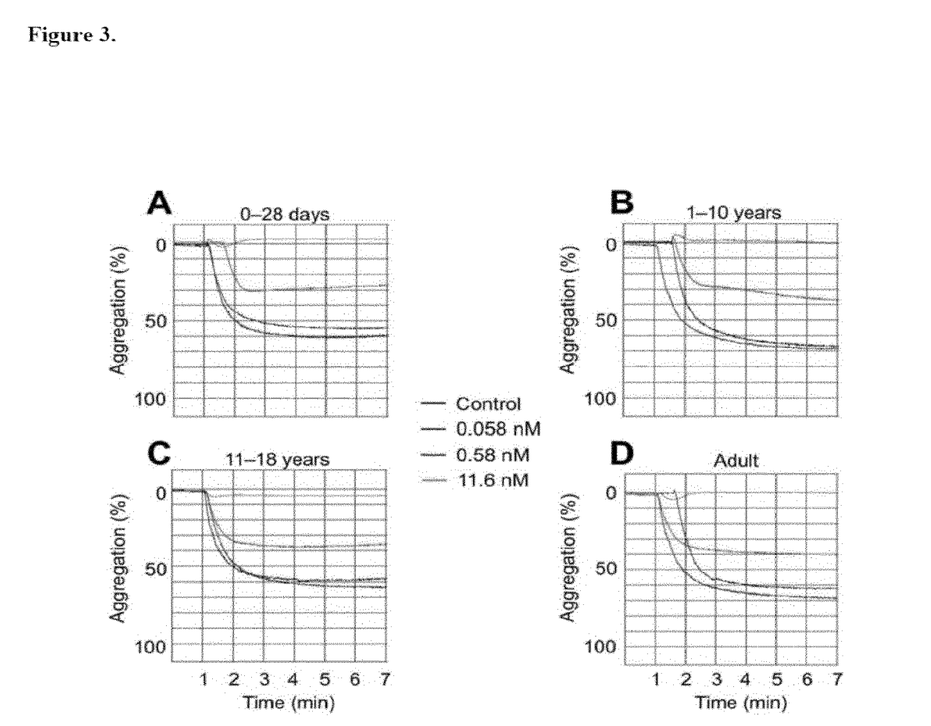
FIG. 3. Effect of cangrelor on platelet aggregation in response to ADP. A-D, Representative tracings of ADP (20 µM)-induced aggregation of platelets isolated from pediatric and pediatric patients with congenital heart disease or healthy adult volunteers in the presence of indicated concentrations of cangrelor.
Figure 4:
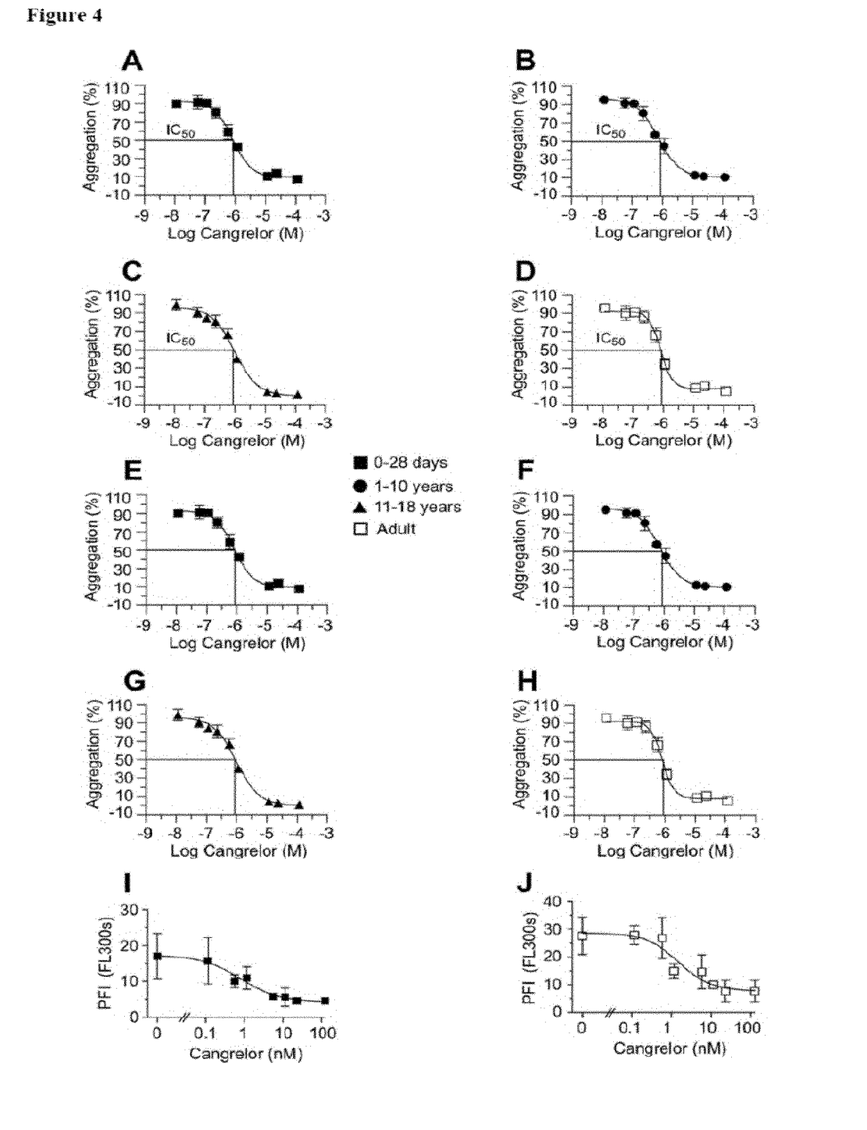

Cangrelor has been shown to be a potent inhibitor of ADP-induced platelet aggregation in adults. To date, no information exists on its ability to effectively mitigate the ADP response of platelets from neonates with congenital heart disease. To this end, we calculated $IC_{50}$ values for this $P2Y_{12}$ receptor antagonist using low and high concentrations of ADP (5 µM versus 20 µM). Consistent with results obtained by flow cytometry and in ADP-induced platelet aggregation studies, no statistical difference was observed in the amount of cangrelor needed to achieve half-maximal inhibition at either concentration of agonist (FIG. 3A through D (20 µM ADP), FIG. 4A through D (20 µM ADP), Figure E through H (5 µM ADP); Table 1, P<0.001).

Similarly results were observed for older populations of patients with congenital heart disease.

Example 2

Platelet Adhesion in Flow Evaluation of Neonates with Single Ventricle Physiology Using Multichannel Microfluidic Device In this Example, the platelet adhesion of neonates with single ventricle physiology was examined by means of multichannel micro fluidic device.

A parallel-plate flow chamber was used to assess platelet accumulation on surface-immobilized plasma VWF at a wall shear rate of $1,600_s$-1.29, 31 In brief, a polyclonal anti-VWF antibody was absorbed overnight (4° C.) to a six-well tissue culture plate. Subsequently, the plate was washed and non-specific interactions blocked by the addition of TBS containing 3% BSA, pH 7.4 (30 min, 37° C.). Human or murine ($VWF^{HA1}$) plasma obtained from heparinized whole blood was added and the plates placed at 37° C. for an additional hour prior to use. Citrated whole blood was then perfused over the reactive substrate for 3 minutes, followed by the addition of platelet buffer lacking CaCl2 for 1 min. The number of platelets attached per unit area was determined by offline analysis (ImagePro Plus, Media Cybernetics, Bethesda, MD) of recorded digital images. For GPIbα inhibition studies, mAb 6D1 (10 µg/ml) was added to anticoagulated human blood for 10 min before use.

Microfluidic devices with 8 individual channels (250 µm wide×60 µm-high) were fabricated in polydimethylsiloxane (PDMS) as previously described. The device was reversibly vacuum-sealed to a glass slide with its flow channels aligned perpendicularly to a patterned type 1 collagen surface (1 mg/ml). To visualize platelet accumulation over time, an Alexa Fluor 488 conjugated, non-function blocking mouse anti-human CD61 (GPIIb/IIIa) antibody was added (1:50 ratio) 7 min prior to performing experiments (0.125 µg/ml final concentration).

Whole blood from neonates with single ventricle pathology or healthy adults was perfused over the prothrombotic surface at an initial wall shear rate of 100 s$^{-1}$ by withdrawal from a single outlet into a syringe pump (Harvard Apparatus Pump 11 Elite, Holliston, MA). Platelet accumulation was visualized (10× objective lens) using an automated inverted microscope system (DMI6000, Leica) equipped with a CCD camera (DFC365FX, Leica). A custom stage insert held three microfluidic devices allowing replicate testing of four conditions. Images were captured in 30 s intervals for a total of 5 min. Platelet fluorescence intensities, which are directly proportional to the total platelet mass were measured and analyzed with Image J software (Image J; NIH, Bethesda, MD). The center 65% of the prothrombotic region was selected for analysis to avoid edge effects. The initial image was taken as background and subsequent images were background corrected. Platelet adhesion and aggregate formation was not observed upstream or downstream of the collagen trip prior to full channel occlusion.

Calculation of half maximal inhibitor concentration and Cangrelor sensitivity Background-corrected fluorescence values were fitted with a 4 parameter dose-response model.

$$FI = A + \frac{A - B}{1 + 10^{[(\text{Log } IC_{50} - C) \times D]}}$$

where C represents the Cangrelor concentration; FT, the background-corrected fluorescence of the corresponding region of interest; A and B, the minimum and maximum intensities, respectively; and D, the Hill coefficient. The data was fitted by a log (inhibitor) vs. response routine in GraphPad Prism 5.00 (GraphPad Software, La Jolla, California).

Results

Further evidence supporting the in vitro potency of cangrelor in reducing the aggregation of platelets from neonates with single ventricle physiology was provided in microfluidic studies that recreate the hemodynamic conditions of thrombosis. Whole blood collected in PPACK was treated with various concentrations of cangrelor and then perfused over surface-immobilized collagen. In each experiment, 8 simultaneously forming thrombi per device were imaged in real time. Fluorescently labeled platelets were observed to accumulate only at the site of collagen exposure, with minimal non-specific upstream or downstream adhesion. Determination of surface fluorescence at 300 s ($FI_{300s}$) permitted calculation of effective $IC_{50}$ values, which were 0.69 nM and 0.95 nM for neonates with CHD versus healthy adults, respectively (FIGS. 4I and J).

Example 3

In Vivo Thrombus Formation Evaluation from Pediatric and Older Patients with Congenital Heart Disease Administration of anesthesia, insertion of venous and arterial catheters, fluorescent labeling of human platelets, and surgical preparation of the cremaster muscle in 12 week old male VWF HA1 mice have been previously described.

Human platelets (700K/μL) were continuously infused (25 μl/min) through a catheter placed in the ipsilateral femoral artery 2 min prior to and during laser-induced injury to ensure a level of circulating cells equivalent to humans.[33] Injury to the vessel wall of arterioles (40-65 μm diameter) was performed with a pulsed nitrogen dye laser applied through a 20× water-immersion Olympus objective. Human platelet-vessel wall interactions were visualized by fluorescence microscopy using a system equipped with a Yokogawa CSU-22 spinning disk confocal scanner, iXON EM camera, and 488-nm laser line (Revolution XD, Andor Technology, South Windsor, CT) to detect Calcein-AM-labeled cells, respectively. The extent of thrombus formation was assessed for 3 min after injury and the maximal area (μm²) of coverage determined by off-line analysis (ImagePro Plus, Media Cybernetics, Bethesda, MD).

After establishing a baseline for normal thrombus generation in injured arterioles, cangrelor was then given initially as an intravenously bolus (30 μg/kg) and then as a continuous infusion (4 μg/kg/min) as described in previously clinical trials.

A minimum of 5 mice per patient group were studied (2 and 4 arterial segments pre and post-cangrelor per mouse, respectively).

Statistics

To compare mean thrombus areas between different treatment groups, we fit linear mixed models with random intercepts for each study animal. Linear mixed models permit comparison of mean differences between treatment groups while also considering the effect of the clustering of the data on the SEs resulting from multiple measurements obtained from each mouse in intravital studies. In the case of platelet aggregation studies, values are presented as mean±SEM. A 2-tailed Student t test was used for comparisons between control conditions and treatments. Differences with values of $P<0.05$ were considered statistically significant.

Results

In Vivo Efficacy of Cangrelor

Previously, we have shown the preclinical utility of an avatar mouse model that preferentially supports human and not mouse platelet-mediated hemostasis and thrombosis.

This switch in species specificity for platelets resulted from the incorporation of the R1326H single mutation into the A1 domain of mouse VWF ($VWF^{R1326H}$), and more recently by replacement of the entire domain with its human counterpart (VWFHA1).

Figure 5:
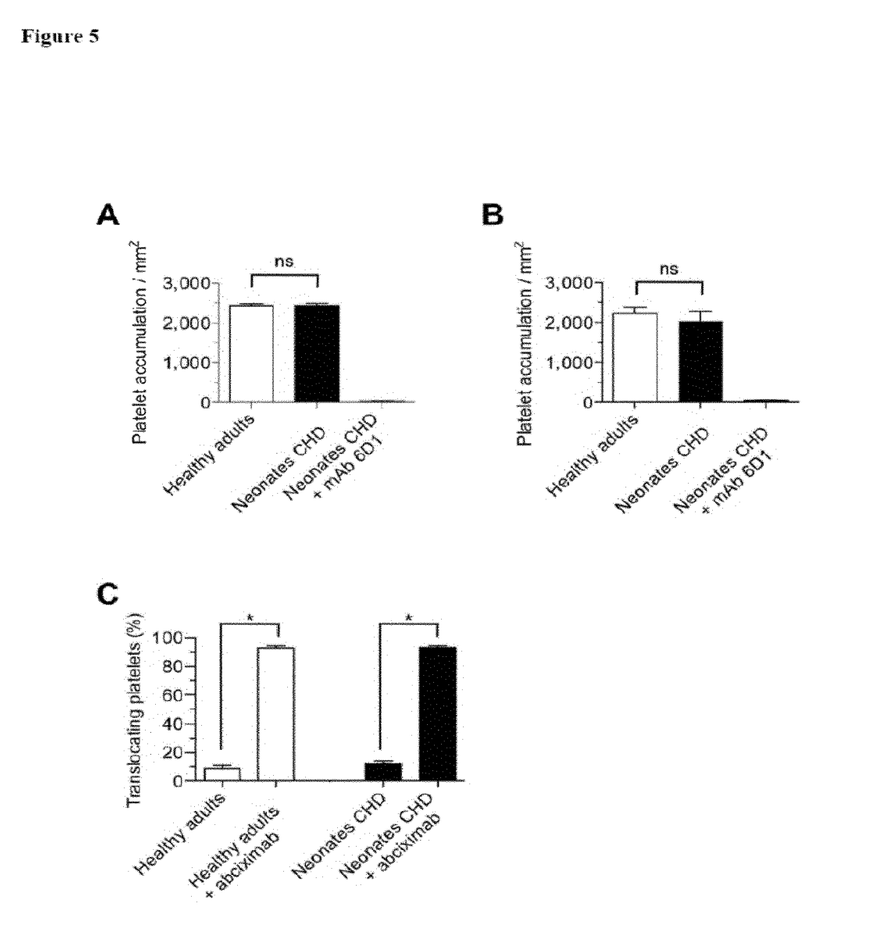
FIG. 5. Human platelet interactions with plasma VWF in flow. A, Accumulation of human platelets on surface-immobilized VWF obtained from mice possessing the human A1 domain (VWFHA1). Whole blood from pediatric patients with single ventricle physiology or healthy adults was infused over the reactive substrate for 3 min (wall shear rate of 1,600 s-1) before assessing the number of interacting platelets. mAb 6D1 is a function blocking antibody to VWF receptor on platelets GPIbα. C, The ability human platelets translocating on surface-immobilized mouse plasma VWFHA1 to undergo firm adhesion and arrest in response to ADP stimulation. Abciximab is a function blocking antibody to integrin αIIbβ3, which is required for firm adhesion. Data represent the mean±SEM (n=5 individuals per group).

Of note, VWF mutant animals have a profound bleeding phenotype due to the inability of mouse platelets to stably interact with damaged vascular endothelium. As human platelet interactions with VWF is key to the initiation of thrombus formation in this avatar mouse model, we first evaluated the ability of platelets from neonates with CHD to accumulate on surface-immobilized human or murine $VWF^{HA1}$ under arterial flow conditions. Importantly, platelets from former accumulated on plasma VWF from humans or $VWF^{HA1}$ mutant mice at levels comparable to those from healthy adults (FIGS. 5A and B). Moreover, no significance difference was observed in the number of platelets from neonates that attached to either substrate (2,432±55 platelets/mm² versus 2,223±156 platelets/mm², respectively; P=0.84). Importantly, this interaction could be inhibited by the addition of the monoclonal antibody 6D1 that blocks the ability of the platelet receptor GPIbα to interact with the A1 domain of VWF.

Although GPIbα initiates platelet deposition at arterial shear rates, this adhesive interaction is labile in nature permitting platelets to translocate in response to forces generated by flowing blood. Ultimately it is the platelet integrin receptor αIIbβ3 that stabilizes adhesion by engaging with ligands such as VWF in response to ADP and/or thrombin. Consistent with this scenario is the ability of abciximab, an inhibitor of human αIIbβ3, to prevent the firm adhesion of platelets from pediatric patients with CHD or healthy adults to surface-immobilized VWF in response to ADP-induced activation in flow (FIG. 5C).

After establishing that plasma $VWF^{HA1}$ supports attachment as well as ADP-induced firm adhesion, we next set out to determine the potential therapeutic effect of cangrelor in preventing human platelet mediated thrombus in vivo. The dose and route of administration of the drug was based on previous clinical trials in adults undergoing PCI.

Figure 6:
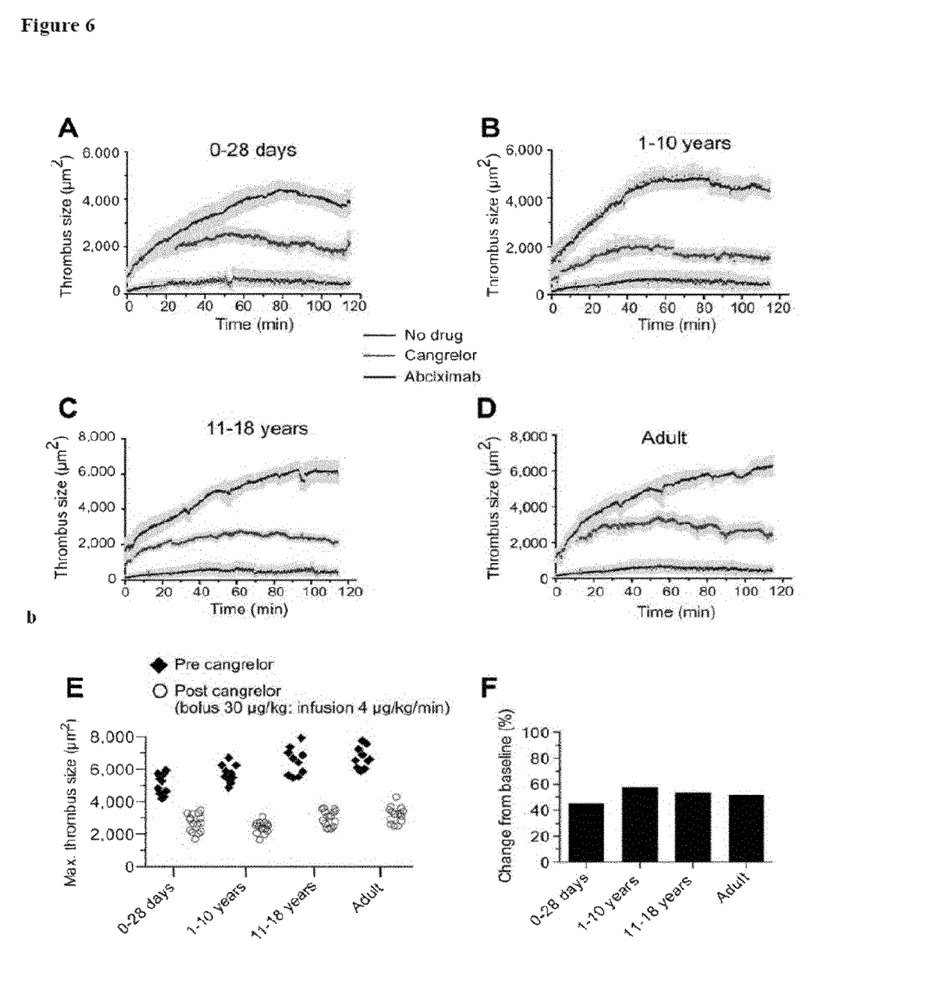

Fluorescently labeled human platelets were infused continuously through a catheter inserted into the femoral artery and their behavior in response to laser-induced arterial injury monitored before and after administration of cangrelor. Consistent with the requirement for ADP to promote a second wave of aggregation, $P2Y_{12}$ receptor blockade on platelets from pediatric cardiac patients yielded a ~45% reduction in thrombus size (P<0.0001) (FIG. 6 A through F; see Table III).

TABLE III

Linear mixed model comparing average human platelet thrombus size (μm2) in VWFHA1 mutant mice. The contrast column is the mean difference between thrombus size pre- and post- administration of cangrelor for each age group tested. Standard errors and statistics were obtained from fitting of the linear mixed model.

| Age group | Contrast estimate | Standard error | P-value |
|---|---|---|---|
| 0-28 days | 2,261 | 224 | <0.0001 |
| 1-10 years | 3,314 | 224 | <0.0001 |
| 11-18 years | 3,475 | 224 | <0.0001 |
| Adult | 3,501 | 224 | <0.0001 |

By contrast, administration of abciximab abrogated platelet accumulation by >90% (P<0.0001). Similar results were obtained using platelets from older patients with congenital heart disease and healthy adults.

Various changes could be made in the above methods without departing from the scope of the invention as defined in the claims below. It is intended that all matter contained in the above description, and as shown in the accompanying figures, shall be interpreted as illustrative and not as limiting.

The invention claimed is:

1. A method of treating shunt thrombosis or stent implantation in a patient, comprising administering a pharmaceutical composition comprising cangrelor, wherein the patient is a pediatric patient suffering from a congenital heart disease, wherein the pharmaceutical composition is administered is between about half an hour and about 24 hours after termination of a procedure on the patient, wherein the procedure is shunt surgery or stent implantation.

2. The method according to claim 1, wherein the procedure is shunt surgery.

3. The method according to claim 2, wherein the shunt surgery is selected from the group consisting of systemic-to-pulmonary artery shunt surgery, Blalock-Taussing shunt surgery, central shunt surgery, and right ventricle to pulmonary artery palliative shunts surgery.

4. The method according to claim 3, wherein the shunt surgery is systemic-to-pulmonary artery shunt surgery.

5. The method according to claim 1, wherein the procedure is stent implantation.

6. The method according to claim 5, wherein stent implantation is ductus arterious stents implantation.

7. The method according to claim 1, wherein the congenital heart defect is single ventricle physiology and the procedure is systemic-to-pulmonary artery shunt.

8. The method according to claim 1, wherein the administering is intravenous.

9. The method according to claim 8, wherein the intravenous administration is a continuous infusion.

10. The method according to claim 9, wherein the amount of cangrelor administered is between about 0.1 and about 4 μg/kg/min.

11. The method according to claim 10, wherein the amount of cangrelor administered is between about 0.1 μg/kg/min and about 1.5 μg/kg/min.

12. The method according to claim 1, wherein the pharmaceutical composition is administered is between about 2 and about 4 hours after the termination of the procedure.

13. The method according to claim 10, wherein the amount of cangrelor administered is between about 0.1 μg/kg/min and about 1 μg/kg/min.

14. The method according to claim 10, wherein the amount of cangrelor administered is between about 0.1 μg/kg/min and about 0.5 μg/kg/min.

15. The method according to claim 10, wherein the amount of cangrelor administered is between about 0.1 μg/kg/min and about 0.3 μg/kg/min.

* * * * *